United States Patent [19]

Shioyama

[11] 4,289,108
[45] Sep. 15, 1981

[54] EXHAUST GAS RECIRCULATION RATE CONTROL DEVICE

[75] Inventor: Giichi Shioyama, Yokosuka, Japan

[73] Assignee: Nissan Motor Company, Limited, Kanagawa, Japan

[21] Appl. No.: 123,569

[22] Filed: Feb. 22, 1980

[30] Foreign Application Priority Data

Feb. 23, 1979 [JP] Japan ................................. 54-19845

[51] Int. Cl.³ .......................................... F02M 25/06
[52] U.S. Cl. .................................................. 123/571
[58] Field of Search .............................. 123/571, 568

[56] References Cited

U.S. PATENT DOCUMENTS

| | | | |
|---|---|---|---|
| 3,969,614 | 7/1976 | Moyer et al. | |
| 4,128,885 | 12/1978 | Valek et al. | 123/571 |
| 4,142,493 | 3/1979 | Schira et al. | 123/571 |
| 4,161,162 | 7/1979 | Latsch et al. | 123/571 |
| 4,161,929 | 7/1979 | Nohira et al. | 123/571 |
| 4,164,206 | 8/1979 | Toelle | 123/571 |
| 4,166,437 | 9/1979 | Bianchi et al. | 123/571 |
| 4,170,973 | 10/1979 | Nohira et al. | 123/571 |
| 4,173,205 | 11/1979 | Toelle | 123/571 |
| 4,190,029 | 2/1980 | Taplin | 123/571 |
| 4,191,144 | 3/1980 | Nohira et al. | 123/571 X |
| 4,195,604 | 4/1980 | Taplin | 123/571 |

FOREIGN PATENT DOCUMENTS 2303310 7/1974 Fed. Rep. of Germany .

*Primary Examiner*—Wendell E. Burns
*Attorney, Agent, or Firm*—Lowe, King, Price & Becker

[57] ABSTRACT

A fuel injection time is calculated from a flow rate of intake air to an internal combustion engine. A rotational speed of the engine is sensed. A desired recirculation rate of exhaust gas is determined by a central processing unit from the fuel injection time and the rotational speed of the engine using memory which contains a two-dimensional look-up table, each lattice point in the table being defined by axes of fuel injection time and rotational speed of the engine, and each lattice-point containing the value of a desired recirculation rate of exhaust gas.

8 Claims, 7 Drawing Figures

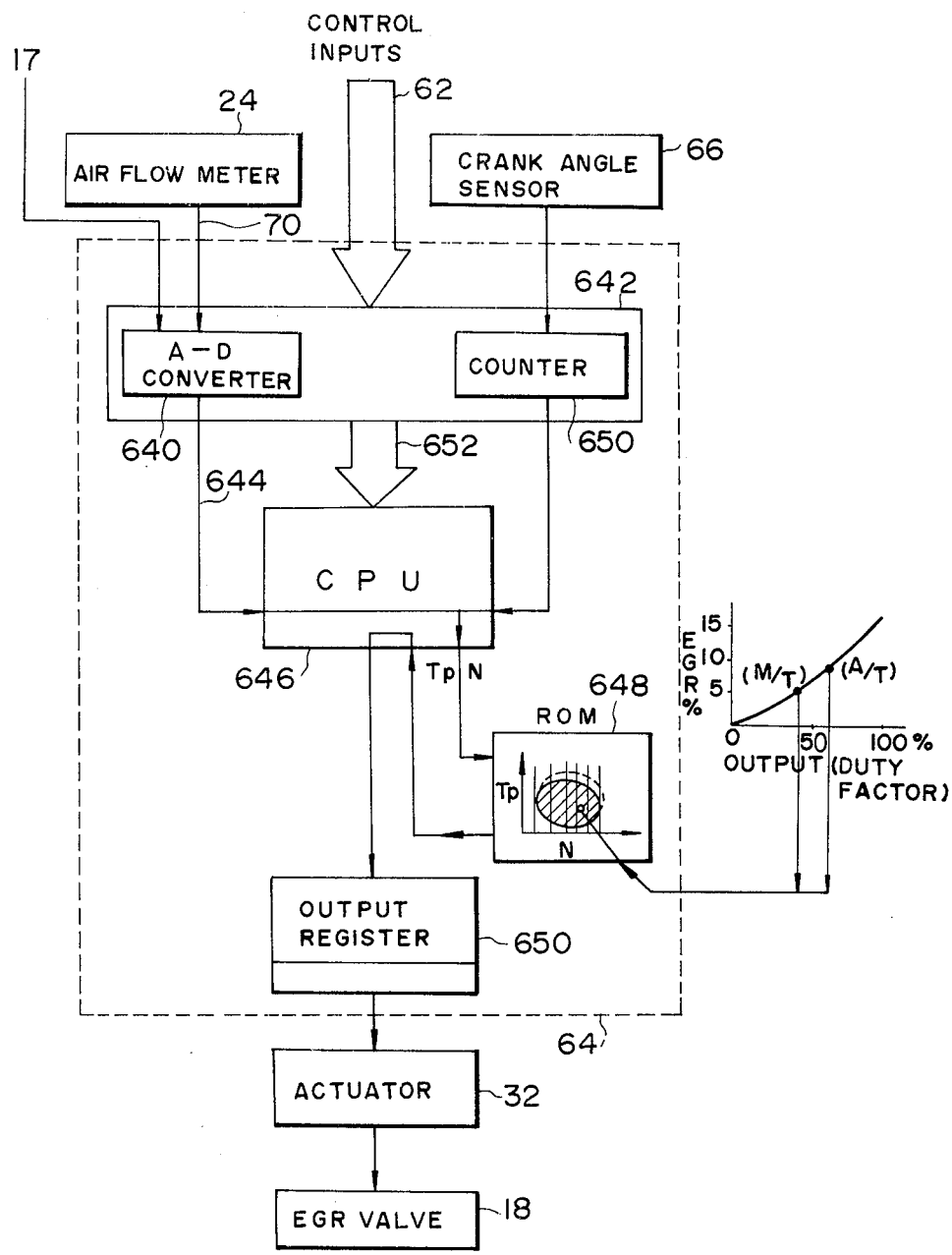

EXHAUST GAS RECIRCULATION RATE CONTROL DEVICE

BACKGROUND OF THE INVENTION

The present invention relates to a control device for an automotive vehicle, and particularly to a control device which controls a rate of exhaust gas recirculated in accordance with the state of operation of an internal combustion engine.

The recirculation of exhaust gas in an internal combustion engine is effected in order to decrease the amount of oxides of nitrogen produced in the exhaust gas. A conventional device for this uses approximate values of functions of the engine load, such as the pressure difference between the upstream and downstream of a throttle valve, the vacuum in a carburetor venturi, etc, in order to control the opening degree of a valve which controls recirculation of the exhaust gas. In such a device, the recirculation of exhaust gas may be stopped when the temperature of cooling water for the engine is relatively low, and the characteristics of the recirculation during warm-up may be adjusted to the regulation of the flow rate of exhaust gas. However, it is difficult to obtain the correct ratio of exhaust gas recirculated for predetermined operational requirements by controlling the recirculation of exhaust gas using a small number of parameters and a small number of valve actuators because of economical problems. Further the recirculation of exhaust gas tends to be effected in operational regions in which the recirculation of exhaust gas is unnecessary. An increase in the number of the actuators and different sensors for precise control will increase the problems of manufacturing errors involved therein, which leads to unsatisfactory control and high manufacturing cost. If the specifications of the internal conbustion engine are changed, a great deal of effect and time is required for replacing and adjusting actuators.

SUMMARY OF THE INVENTION

It is therefore an object of the present invention to provide an exhaust gas recirculation control device which greatly reduces the difference between the desired and the actual operational parameters in the characteristics of exhaust gas recirculation.

The present invention provides, in an exhaust gas recirculation system for an internal combustion engine having a valve for controlling a flow rate of exhaust gas recirculated from an exhaust gas outlet to an intake air inlet of the engine, a control device comprising:
(a) first sensor for determining a flow rate of intake air to the engine;
(b) second sensor for determining the rotational speed of the engine;
(c) first calculating means for determining fuel injection time value from the output of the first sensor;
(d) memory in which is stored a two-dimensional look-up table of exhaust gas recirculation rates for a lattice of points representing values of rotational speed of the engine and fuel injection time; and
(e) second calculating means adapted to refer to the look up table and determine data corresponding to the fuel injection time calculated and the rotational speed of the engine determined, and supplying the data for control of the valve.

The use of a two-dimensional table allows the required flow rate of recirculated exhaust gas to be precisely determined at any point within the operational region, thereby eliminating the need to increase the number of actuators and therefore avoiding problems of inconsistencies in the devices used. A change in the specifications of the engine correspondingly only requires replacement of the read only memory used.

In the particular embodiment, in order to improve control at steep, or rapidly changing, portions of the exhaust gas recirculation characteristics, the lattice on which the data valves are given, has unequal divisions on at least one of the axes: fuel injection time ($T_p$) or the number of engine rotations per unit time (N).

In another aspect of the present invention, in order to decrease the memory requirements for regions requiring no exhaust gas recirculation and thereby to simplify the recirculation control, the area covered by the table is made as small as possible, and if the operational data values are outside the outer limit of the table, the data values on the outer limit of the table, are used to stop the recirculation of exhaust gas.

In a further aspect of the present invention, in order to increase the accuracy of control and to simplify the arithmetic operations, a data value not actually included in the table is calculated by linear interpolation from the four surrounding lattice points.

In a still further aspect of the present invention, in order to effect correct control of the exhaust gas recirculation in vehicles of the same kind but of different operational characteristics, two kinds of lattice-point tables are used, which are adjusted to the exhaust gas recirculation characteristics of a manual and an automatic transmission which have different operational regions.

BRIEF DESCRIPTION OF THE DRAWINGS

These and other objects, features and advantages of the present invention will be apparent from the following description taken in conjunction with the accompanying drawings. In the drawings:

FIG. 2 is a block diagram of the device in FIG. 1;

DETAILED DESCRIPTION OF THE PREFERRED EMBODIMENT

Figure 1:
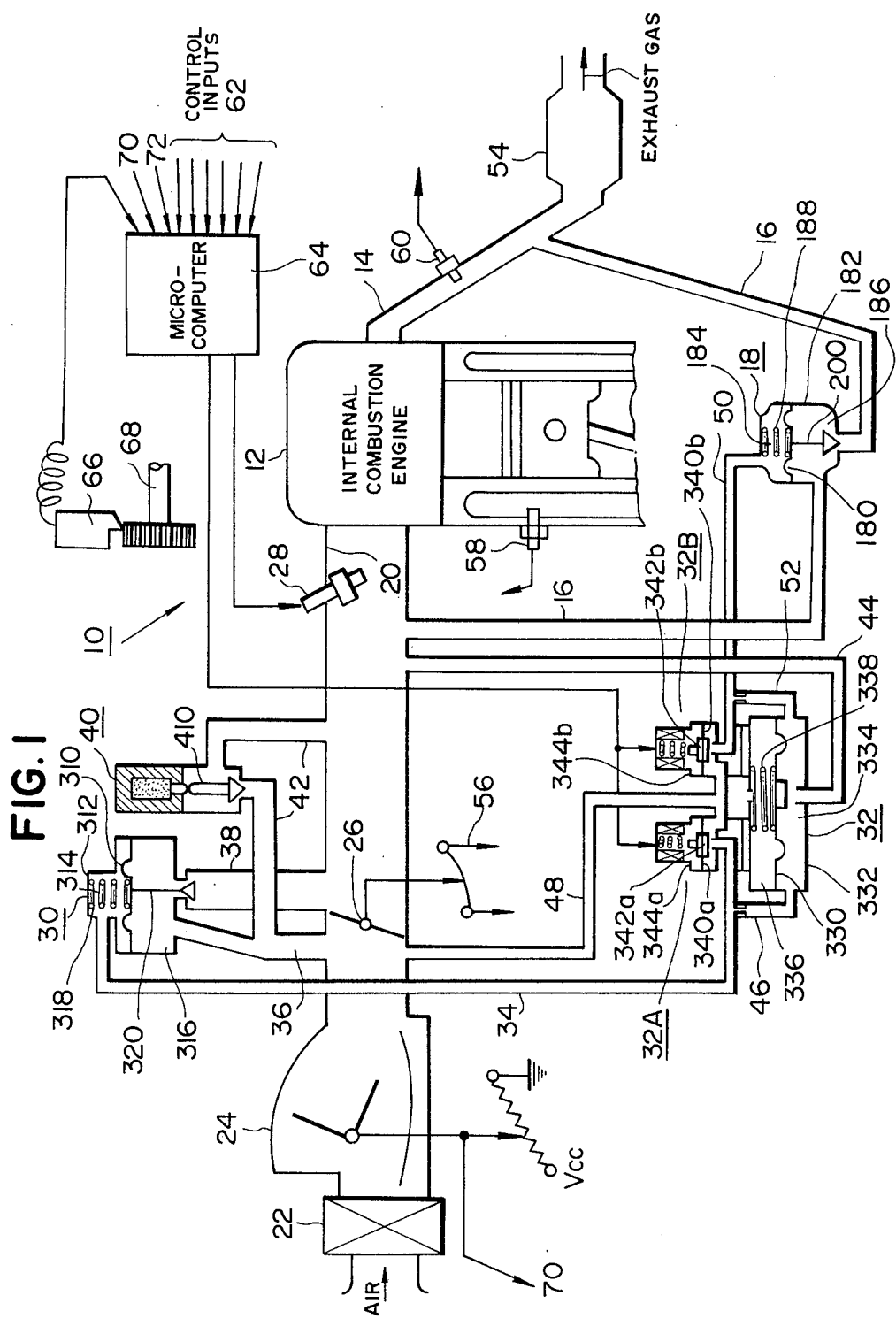
FIG. 1 is a schematic view of a preferred embodiment of the exhaust gas recirculation control device according to the present invention.

The same reference numeral denotes corresponding parts or elements throughout the drawings.

Referring to FIG. 1, the basic concept of the exhaust gas recirculation control device 10 according to the present invention is shown in which part of the exhaust gas from an internal combustion engine 12 is recirculated through an exhaust pipe 14, a recirculation passage 16, an exhaust gas recirculation valve 18 (referred to as an EGR valve hereinafter) provided in the passage 16 to an intake pipe 20. The valve 18 includes a diaphragm 180 partitioning a casing 182 into chambers 184 and 186. The chamber 184 includes a return spring 188 which biases a valve member 200, secured at one end to the diaphragm 180 and enclosed in the chamber 186, in the direction of closing the passage 16.

The intake pipe 20 is provided with an air cleaner 22, an air flow meter 24, a throttle valve 26, and a fuel injecter 28 which feeds fuel to the engine.

An auxiliary air valve 30 includes a diaphragm 310 partitioning a casing 312 into two chambers 314 and 316. The chamber 314 contains a return spring 318 which moves the diaphragm 310 downward and receives a appropriate reference pressure from an output actuator 32 through a pipe 34. The chamber 316 communicates between upstream and downstream of the throttle valve 26 through pipes 36 and 38. Thus a valve member 320 moves upward and downward according to the difference in pressure between upstream and downstream of the throttle valve 26. An air regulator 40 has a valve member 410 which opens a passage 42 which communicates between upstream and downstream of the throttle valve 26 only during the cold state or when the engine is idling.

The actuator 32 includes a diaphragm 330 partitioning a case 332 into two chambers 334 and 336. The chamber 334 communicates through a pipe 44 with the intake passage 20 downstream of the throttle valve 26 and through an outlet pipe 46 with the pipe 34. The chamber 336 is maintained the atmospheric pressure and provided with a return spring 338 which exerts a pressure on the diaphragm 330. The actuator 32 is provided with a first actuator section 32A which is disposed in a passage 48 communicating between upstream of the throttle valve 26 and the outlet pipe 46 of the chamber 334. The actuator section 32A is provided with a diaphragm 340a and a vertically movable valve member 342a secured thereto in a casing 344a. The valve member 342a is electromagnetically operated so as to open and close the passage 48 according to an instruction from a microcomputer as will be described hereinafter in more detail, in order to apply a desired reference pressure to the chamber 314 of the valve 30.

A second actuator section 32B has a similar structure to the first actuator section 32A; the second actuator section 32B is disposed in a passage 50 communicating between the control chamber 184 of the exhaust gas recirculation valve 18 and the end of the passage 48 on the side of the section 32A. The chamber 334 of the output actuator 32 communicates through an outlet pipe 52 with the passage 50 between the section 32B and the valve 18. The actuator section 32B is provided with a diaphragm 340b and a vertically movable valve member 342b secured thereto in a casing 344b. The valve member 342b is electromagnetically operated so as to open and close the passage 50 according to instructions from the microcomputer and thereby to control the pressure within the chamber 184 of the valve 18. This moves the valve member 200 vertically thereby to control the flow rate of exhaust gas recirculated through the pipe 16 from the exhaust side to the intake air side.

The exhaust pipe 14 is provided with a catalistic converter 54 (for example, a three-way convertor) which serves to remove harmful contents of the exhaust gas.

A different kind of analog control signals obtained during the operation of the engine such as, for example, the output signals from a throttle valve switch 56, a water temperature sensor 58 which senses the temperature of cooling water for the engine, and an $O_2$ sensor 60 in the exhaust pipe 14 are inputted as a group of control inputs 62 to the microcomputer 64. This microcomputer processes the group of control inputs 62 to control the output actuator 32 so as to open and close the EGR valve 18. A crank angle sensor 66 detects the rotation of a crank shaft 68 to feed a reference pulse and an angle pulse which is produced for each unit angle of the engine rotation, to the microcomputer 64. The output 70 of the air flow meter 24 representing the flow rate of the intake air to the engine 12, and a switching signal 72 representing whether the transmission, not shown, is in the position of automatic transmission (A/T) or in the position of manual transmission (M/T), are supplied to the microcomputer 64.

Referring to FIG. 2, the basic control operation of the microcomputer 64 is illustrated by a block diagram. The output 70 of the air flow meter 24 indicating the flow rate of intake air to the engine is converted by an analog to digital converter 640 in a large scale integrated circuit (LSI) 642 to a corresponding digital output 644 which is fed to a central processor unit (CPU) 646 which calculates the required flow rate of fuel represented by the fuel injection time $T_p$ of the fuel injection valve 28 in the particular embodiment, from the flow rate of intake air associated with the group of control inputs 62, such as the water temperature input from the sensor 58, to feed the calculated results to the injection valve 28. The reference and angle outputs of the crank angle sensor 66 are counted by a counter 650 in the LSI 642 and fed to the CPU 646 to determine the number of rotations N of the engine per unit time. The following operation is based on the two signals $T_p$ and N, using a read only memory (ROM) 648.

As shown as a graph within the symbol for the ROM 648, an exhaust gas recirculation (EGR) region is determined from a maximum limit $N_{max}$ of the number of the engine rotations per unit time and a maximum basic fuel injection time $T_{max}$. There is a difference in EGR region between the manual transmission M/T and the automatic transmission A/T; the region hatched and surrounded by the solid line in the two-dimensional table is for vehicles provided with a manual transmission while the wider region up to the broken line is for vehicles provided with an automatic transmission. A graph shown on the right side of the ROM 648 illustrates that EGR rates for M/T and A/T and therefore duty factors converted therefrom at the same point in the graph in the ROM 648 differ from each other. The CPU uses the signals $T_p$ and N and a signal indicating M/T or A/T to address the ROM 648 and extract the required data for determining the EGR rate.

The CPU 646 which in turn feeds the EGR rate as a control signal to an output register 650. This register operates the output actuator 32 to open the EGR valve 18 to a desired degree as shown in FIG. 1. The anolog control inputs 62 mentioned above are fed to the LSI 642 and hence fed as corresponding digital signals 652 to the CPU 646 for use as desired scale factors for the EGR rate.

Figure 3A:
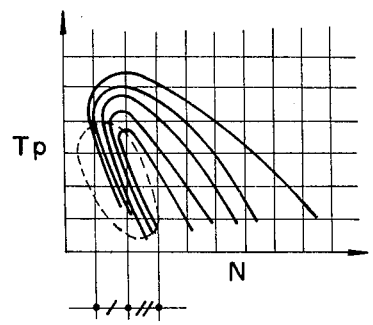
FIGS. 3A and 3B are tables having equal and unequal interval scales stored in a memory in FIG. 2.
Figure 3B:
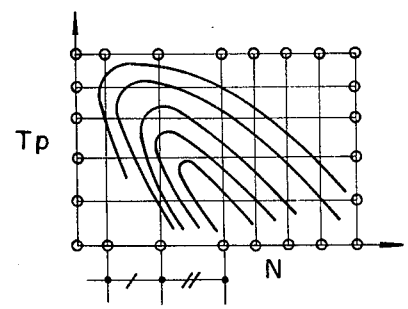

In the particular embodiment, the N and $T_p$ scales of the two-dimensional table stored in the ROM 648 are unequal. By comparison, a graph of equal interval scales is shown in FIG. 3A where the dense curve portions surrounded by the broken line indicate a steep change in the EGR rate. Accordingly, slight errors in the N and $T_p$ values in the table produce a relatively great error in the flow rate of the EGR which increases the probability of producing harmful contents in the exhaust gas. A two-dimensional table rewritten with unequal scales is shown FIG. 3B which contains no steep, or dense, portions thereby allowing a precise measurement.

Further, in the particular embodiment, the N and $T_p$ values corresponding to portions of the table which require no EGR need not be memorized. When the numeral values obtained are outside the table, the numerical values on the outer limit shown by the solid or broken line are read and used to stop EGR, which makes the table and hence the memory smaller.

Figure 4A:
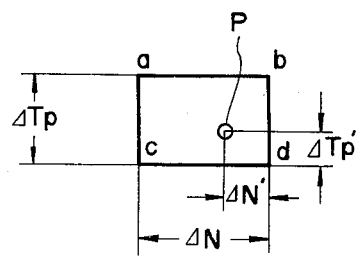
FIGS. 4A and 4B illustrate the interpolation of data between lattice points.
Figure 4B:
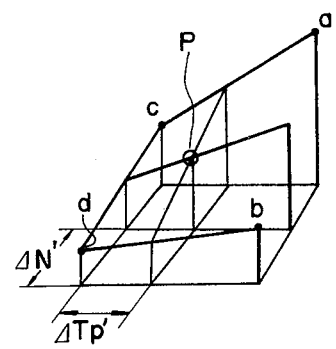

When the operational state of the engine, i.e. a datum point P defined by real N and $T_p$ values obtained, is not at a lattice point, as shown in FIGS. 4A and 4B, the values at the four surrounding points a, b, c and d around the point P are selected as the object of calculation and linear proportional interpolation is carried out on the four points to obtain a value at the point P. In this calculation, the errors introduced by the use of a linear interpolation method are very small, but the savings in time are very great.

Figure 5:
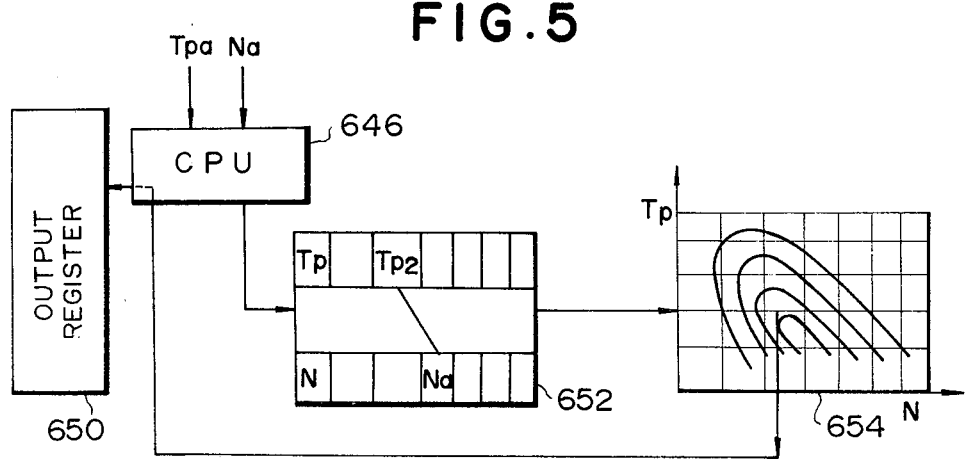
FIG. 5 illustrates reading of a read only memory by a CPU.

FIG. 5 shows the process whereby the CPU reads the appropriate values from the ROM 654, when the two-dimensional look-up table is stored with unevenly spaced lattice points. First the CPU uses an address look-up table 652, to find the addresses for $T_p$ and N, and then uses these addresses to reference the main look-up table 654. When interpolation is required, the look-up process is repeated four times, and then the linear interpolation of operation is carried out.

Briefly, the process involved in the present invention is carried out as follows. First the program checks, whether the starter switch, not shown, is turned on or off. If the switch is turned on, the engine is not in the steady-state but under start control, and therefore the EGR valve 18 is fully closed. If the starter switch is turned off, calculation is carried out for fuel injection time $T_p$ and the number N of engine rotations per unit time. Then the required point in the look-up table is determined, and after selecting the correct table on the basis of whether manual or automatic transmission is used, the data values are read out and a linear interpolation is carried out. The values on the outer limit of the table are used as control values for the portions outside the outer limits of the table, i.e. for the range in which EGR is unnecessary. Thus EGR rates and the opening degrees of the EGR valve are determined.

The present invention has the following advantages: first, the exhaust gas recirculation characteristics are controlled with an extremely high accuracy thereby requiring only operating actuators in place of a conventional mechanical control device. Thus, the control devices are not so much subject to manufacturing errors involved, and are equal in quality, and excellent in durability. The exhaust gas recirculation rates satisfying the respective operational requirements result, thereby highly improving the efficiency of fuel consumption. The replacement of the EGR characteristics corresponding to the respective specifications of the types of automotive vehicles, transmissions and regulations of the countries to which the vehicles are sent only requires the replacement of the ROM 648 and the arithmetic operational section of the CPU 646 only.

Of course the present invention has been described in terms of a preferred embodiment thereof, and various changes in the details thereof will be clear to those skilled in the art. For example, the memory in which the look-up table is stored has been described as a read-only memory, but it is possible to use any suitable storage device, including a ramdom access memory and so on.

What is claimed is:

1. In an exhaust gas recirculation system for an internal combustion engine having a valve for controlling a flow rate of exhaust gas recirculated from an exhaust gas outlet to an intake air inlet of the engine, a control device comprising:
    (a) first sensor for measuring a flow rate of intake air to the engine;
    (b) second sensor for measuring the rotational speed of the engine;
    (c) first calculating means for determining fuel injection time from the output of the first sensor;
    (d) memory in which is stored a two-dimensional look-up table of exhaust gas recirculation rates for a lattice of points representing values of rotational speed of the engine and fuel injection time; and
    (e) second calculating means adapted to refer to the look up table and determine data corresponding to the fuel injection time calculated and the rotational speed of the engine measured, and supplying the data for control of the valve.

2. The control device of claim 1, wherein the lattice of points has unevenly spaced values along at least one of the axes.

3. The control device of claim 1, wherein the lattice includes the whole region in which exhaust gas recirculation is carried out.

4. The control device of claim 3, wherein the look-up table includes at least one data value to be used as the exhaust gas recirculation rate for valves of the rotational speed of the engine and fuel injection time which fall outside the lattice.

5. The control device of claim 1, wherein a data value within a rectangle formed by four adjacent data in the table is calculated by interpolation from the four surrounding data.

6. The control device of claim 1, wherein the table varies in region according as a manual transmission or an automatic transmission is used.

7. The control device of claim 1, wherein the first sensor is of the type of outputting an analog output, and wherein the first calculating means includes an analog to digital converter for converting the output of the first sensor to a corresponding digital output.

8. The control device of claim 1, wherein the second sensor includes a crank angle sensor for outputting reference and angle pulses which represents the rotational angle of the engine and a counter for counting the reference and angle pulses from the crank angle sensor.

* * * * *